Sept. 1, 1925.

A. J. COLDWELL 1,551,543

POWER LAWN MOWER

Filed May 22, 1922

Inventor
ARTHUR J. COLDWELL.

Attorneys.

Patented Sept. 1, 1925.

1,551,543

UNITED STATES PATENT OFFICE.

ARTHUR J. COLDWELL, OF LANSING, MICHIGAN, ASSIGNOR TO IDEAL ENGINE COMPANY, OF LANSING, MICHIGAN, A CORPORATION OF MICHIGAN.

POWER LAWN MOWER.

Application filed May 22, 1922. Serial No. 562,784.

*To all whom it may concern:*

Be it known that I, ARTHUR J. COLDWELL, a citizen of the United States of America, residing at Lansing, in the county of Ingham and State of Michigan, have invented certain new and useful Improvements in Power Lawn Mowers, of which the following is a specification, reference being had therein to the accompanying drawings.

The invention relates to lawn mowers and more particularly to motor driven lawn mowers in which the mower unit is propelled from the wheel supported frame supporting the motor. It is the object of the invention to provide mechanism for raising the mower unit from the ground and lowering the same to the ground, gradually, thereby avoiding the liability of indenting the ground. Other objects of the invention reside in the novel features of construction and combinations and arrangements of parts as more fully hereinafter set forth.

Figure 1:
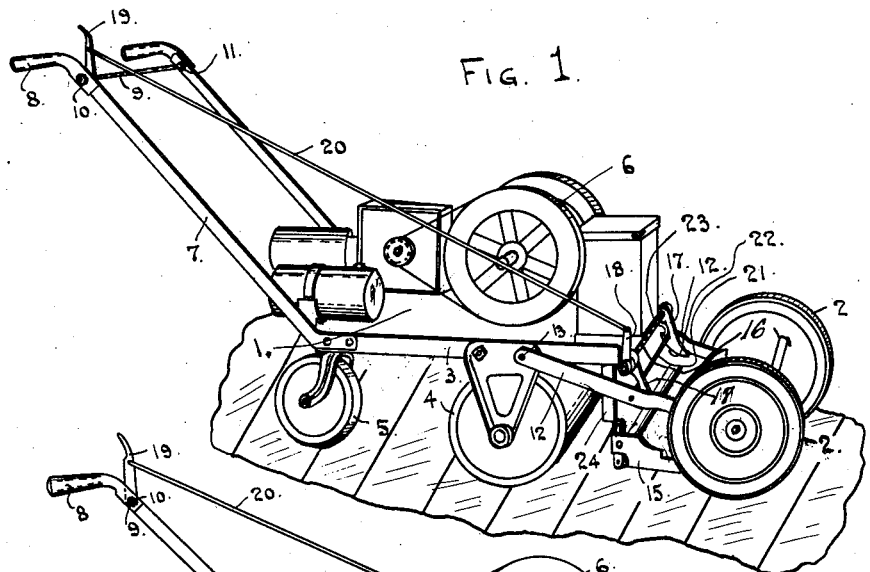
Figure 1 is a perspective view of a motor driven lawn mower embodying my invention and showing the mower unit in raised position.

The lawn mower comprises the tractor 1 and the mower unit 2 in advance thereof and adapted to be propelled therefrom. The tractor has the frame 3 mounted upon the front roller wheel 4 and rear castor wheel 5, and carrying the motor 6. Extending upwardly and rearwardly from the rear end of the frame are the handle bars 7 terminating in the handles 8, these bars being held in parallel spaced relation by the rod 9 and nuts 10 and 11 at opposite ends which also clamp the handles to the bars. The motor 6 is suitably connected to the roller wheel 4 to propel the tractor.

The mower unit is propelled from the tractor by means of the propelling links 12 which extend downwardly and forwardly from their points of pivotal connection 13 to the frame 3 of the tractor to their points of pivotal connection 14 to the side frames 15. The pivots 13 and 14 freely pass through the propelling links 12 to permit of vertical rocking movement of the mower unit relative to the tractor so that the latter will have a travel over the ground conforming to its contour.

Figure 2:
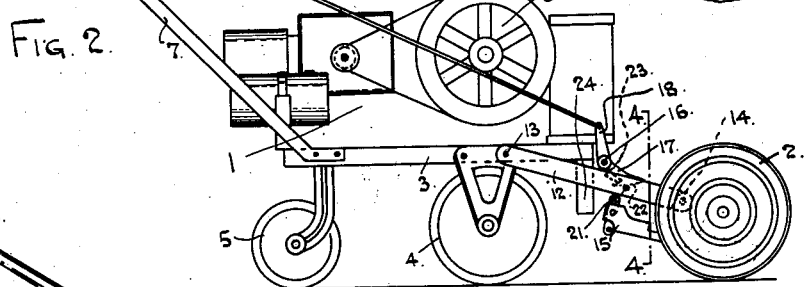
Figure 2 is a side elevation thereof showing the wheel supported frame carrying the motor and the mower unit in normal or operative positions.

To raise the mower unit 2 from the ground, and also lower the same to the ground, I have provided the rock shaft 16 journalled at the forward end of the tractor frame 3, the depending hook-shaped members 17 fixedly secured to the rock shaft near its opposite ends, and the lever 18 fixedly secured to the rock shaft at one end and connected to the hand lever 19 pivoted upon the cross rod 9 through the connecting rod 20. There is also the cross rod 21 extending between the propelling links 12 in advance of the rock shaft 16 and below the same, this rod being so positioned that with the parts in their normal operative positions, as shown in Figure 2, the lower faces 22 of the hooked members 17 rest upon the cross rod.

By tilting the tractor upwardly and forwardly about the roller wheels 4, the lower faces of the hooked members ride downwardly and forwardly over the cross rod 21 until their rear ends have passed this cross rod when the hooked members will swing rearwardly to bring their hook portions 23 below the cross rod. At this time, the parts have the positions as shown in full lines in Figure 3. Then by lowering the rear end of the tractor to bring the caster wheel 5 into engagement with the ground, the hooked members through the cross rod and propelling links raise the mower unit off the ground to occupy a position as shown in Figure 1.

Figure 3:
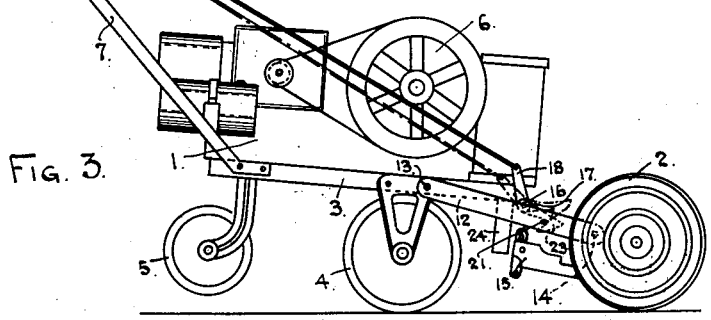
Figure 3 is a similar view showing the wheel supported frame carrying the motor in a tilted position.
Figure 4:
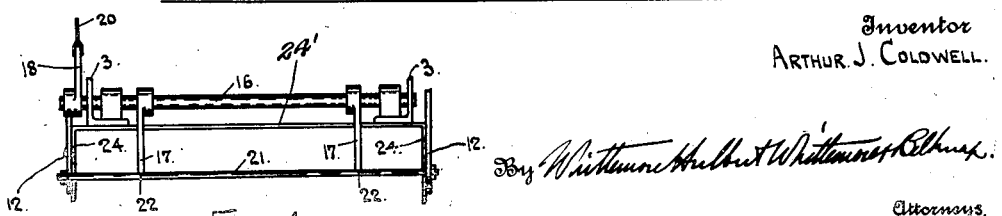
Figure 4 is a cross section on the line 4—4 of Figure 2.

With the mower unit in raised position, the same can be readily lowered into operative relation with the ground by again tilting the tractor frame upwardly and forwardly about the roller wheel 4 until the ground wheels of the mower unit freely engage the ground, after which, the hand lever 19 may be swung downwardly and rearwardly to rock the hooked members 17 upwardly and forwardly to bring their hook portions beyond the cross rod 21, these parts having the positions as shown by the dotted lines in Figure 3. Then while the hooked members are retained out of engagement with the cross rod, the rear end of the tractor can be gradually lowered to bring the caster wheel into engagement with the ground, after which the hand lever 19 can be swung upwardly and forwardly to permit the lower faces of the hooked members to ride upon the cross rod between the propelling links. With this arrangement, liability of suddenly dropping either the mower unit or the rear end of the tractor upon the ground, is prevented since the lowering of both the mower unit and of the rear end of the tractor is controlled by the raising or lowering of the handles, which through the handle bars, have a very great leverage effect.

Another feature of my invention resides in providing the cross bar 24' between the forward ends of the side sills of the tractor frame with the depending arms 24 for guiding the propelling links 12 in their vertical movements.

What I claim as my invention is:

1. In a lawn mower, the combination with a wheel supported frame, of a vertically movable mower unit, a propelling connection between said frame and mower unit, and means permitting of the travel of said mower unit upon the ground when said wheel supported frame is in one position, said means automatically being operable when said frame is moved to another position to raise said mower unit from the ground.

2. In a lawn mower, the combination with a wheel supported frame, of a vertically movable mower unit, a propelling connection between said frame and mower unit, and means permitting of the travel of said mower unit upon the ground and automatically operable upon tilting movement of said frame to raise said propelling connection and mower unit from the ground.

3. In a lawn mower, the combination with a wheel supported frame, of a vertically movable mower unit at one end thereof, a propelling connection between said frame and mower unit, and a hooked member adapted to raise said propelling connection and mower unit from the ground upon tilting movement of said frame, and releasing mechanism for said hooked member.

4. In a lawn mower, the combination with a wheel supported frame, of a vertically movable mower unit at one end thereof, propelling links pivotally connected to said frame and mower unit, a transversely extending member upon one of said links, and a hooked member upon said frame permitting of the travel of said mower unit upon the ground and having a hook portion adapted to automatically engage said transversely extending member upon tilting movement of said frame in one direction, and to thereby raise said mower unit upon subsequent tilting movement of said frame in the opposite direction.

5. In a lawn mower, the combination with a wheel supported frame, of a vertically movable mower unit, a propelling link between said frame and mower unit, a transversely extending member upon said propelling unit, a hooked member permitting of the travel of said mower unit upon the ground and having a hook portion engageable with said transversely extending member upon tilting movement of said frame in one direction and adapted to thereby raise said mower unit from the ground upon tilting movement of said frame in the opposite direction, and means controlling the operation of said hooked member.

6. In a lawn mower, the combination with a wheel supported frame, of a vertically movable mower unit, propelling links pivotally connected to said frame and mower unit, a cross rod extending between said propelling links, a hooked member upon said frame permitting of the travel of said mower unit upon the ground and having a hook portion automatically engageable with said cross rod upon tilting movement of said frame in one direction and adapted to thereby raise said mower unit from the ground upon tilting movement of the tractor frame in opposite directions.

7. In a lawn mower, the combination with a wheel supported frame, of a vertically movable mower unit, propelling links pivotally connected to said frame and mower unit, a cross rod extending between said propelling links, a rock shaft journalled upon said frame, hooked members fixedly secured upon said rock shaft and having hook portions adapted to engage said cross rod upon tilting movement of said frame in one direction and to thereby raise said mower unit upon tilting movement of said frame in the opposite direction.

8. In a lawn mower, the combination with a wheel supported frame, and a rearwardly and upwardly extending handle bar, of a vertically movable mower unit in advance of said frame, propelling links pivotally connected to said frame and mower unit, a cross rod extending between said propelling links, a rock shaft journalled upon the forward end of said frame, hooked members fixedly secured to said rock shaft and having hook portions engageable with said cross rod upon upward and forward tilting movement of said frame, thereby raising said mower unit upon rearward and downward tilting of said tractor frame, and means operated from said handle bar and adapted to rock said rock shaft.

9. In a lawn mower, the combination with a wheel supported frame, of a vertically movable mower unit adapted to be propelled therefrom, means for guiding said mower unit during its vertical movements, and means permitting of the travel of said mower unit upon the ground and operable upon angular adjustment of said frame from its normal position to engage said mower unit to raise the same from the ground when said frame is angularly adjusted back to normal position.

10. In a lawn mower, the combination with a wheel supported frame, of a vertically movable mower unit adapted to be propelled therefrom, propelling links connecting said frame and unit, guide elements for said links secured to and depending from said frame, and means for detachably connecting said unit to said frame to be raised by tilting of the frame, or to occupy its working position when detached.

In testimony whereof I affix my signature.

ARTHUR J. COLDWELL.